Dec. 31, 1968   J. W. DE CELIS   3,419,145
SEPARATION TANK AND METHOD
Filed June 10, 1966
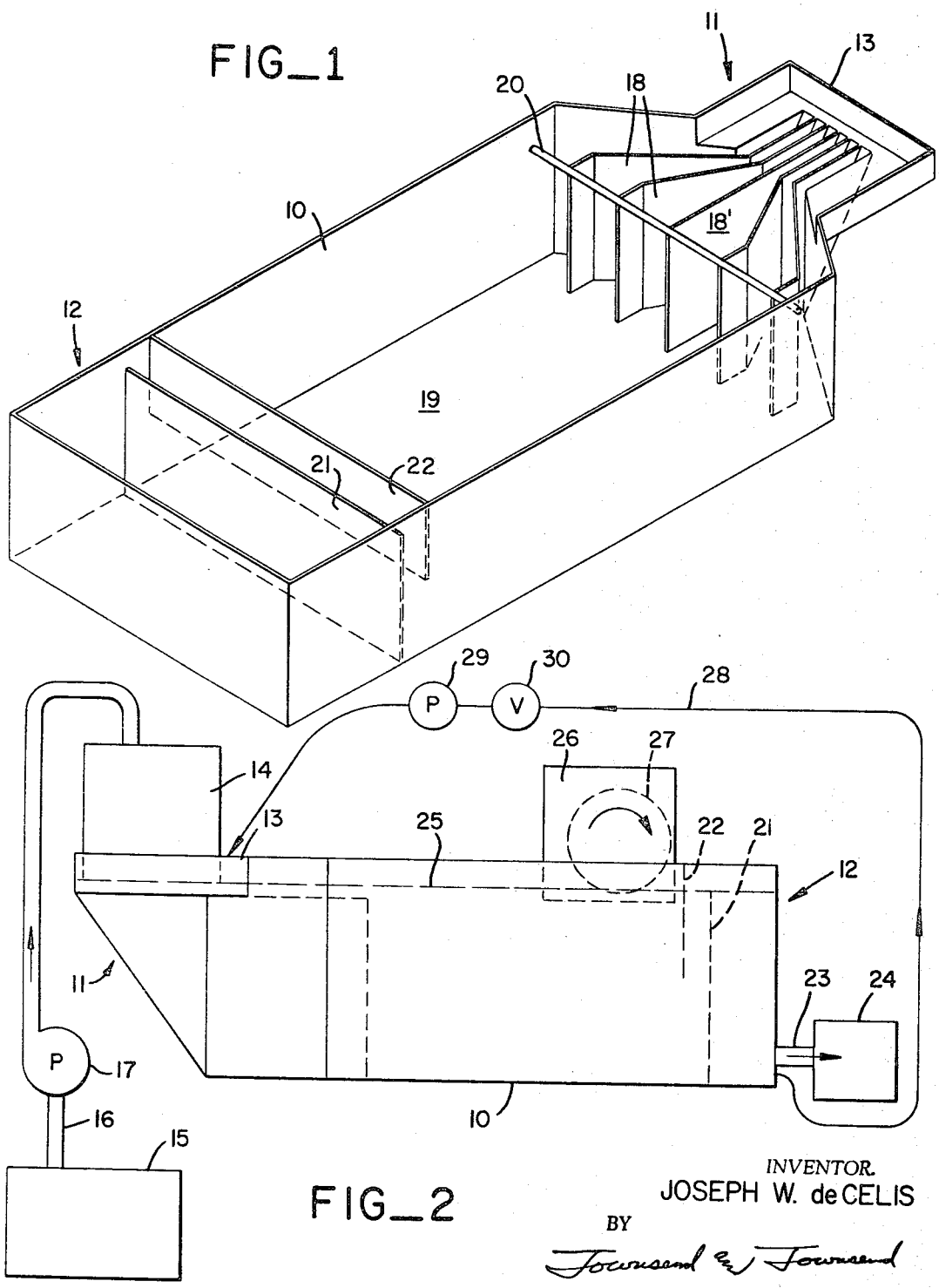
INVENTOR.
JOSEPH W. de CELIS
BY
Townsend & Townsend
ATTORNEYS 3,419,145
SEPARATION TANK AND METHOD
Joseph W. de Celis, San Francisco, Calif., assignor to
De Laval Turbine Inc., Miilbrae, Calif.
Filed June 10, 1966, Ser. No. 556,694
5 Claims. (Cl. 210—84)

ABSTRACT OF THE DISCLOSURE

Apparatus and method for separating two fluids, one of which is a separable composite of two or more fluids, such as the separation of a first oil from a second oil-water emulsion. The apparatus provides a rectangular separation tank with baffles at the inlet end to guide input fluid occupying a smaller cross-sectional area relative to the tank's cross-sectional area into the main body of the tank so as to avoid short circuiting of the fluid while passing through the tank. The separation method involves regulation of the fluid flow rate through the separation tank so as to create an amount of turbulence large enough to avoid separation of the emulsion, but not so great as to prevent gravitational separation of the first oil from the second oil-water emulsion.

This invention relates to the separation of fluids. In a more specific aspect, it relates to the separation of two major fluids on a continuous basis in which one of the major fluids to be separated is a composite of plurality of fluids that is temporarily in a homogeneous state, but which is itself separable into its component parts. In separating the two major fluids, the invention may utilize a settling tank through which the fluids are passed. A separation is achieved in the tank based upon a differential of particle size and density of the two major fluids and with the aid of gravity.

A great deal of work has been done in the art of separating fluids with settling tanks. Formulas have been worked out to achieve an optimum separation in which the geometry of the tank and the desired volume and flow rates of the fluid are considered. For example, the following formula has been proposed for achieving optumum results with a settling tank:

$$(S.I.)_c = \frac{0.943 L^{1.045} W^{2.45} D^{1.4}}{Q^{1.56} m^{1.2}}$$

In the above formula, $(S.I.)_c$ represents a corrected separation index in which the separation index represents the time in seconds under static conditions that gives settling equivalent to any tank described by the equation. The other elements in the formula are defined as follows:

L=feet, tank length
Q=cubic feet per minute flow
$m$=hydraulic radius in feet=$WD/2D+W$
W=feet, tank width
D=feet, tank depth The present invention in a sense is concerned with a specific application of the principle illustrated by the above equation. In this case a separation of at least two fluids by gravitational settling is sought. One of the fluids may or may not be a single entity, but at least the other fluid comprises a plurality of component fluids that are temporarily bound together as a homogeneous mass, and which can be separated into the component parts by various techniques, including gravitational settling. The problem solved by the present invention is how to separate the two major entities without causing a separation of the homogeneous blend which forms this latter one of the two major entities.

An example of the type of system to which the present invention is applicable is in connection with the cooling and lubricating liquids used in the rolling of sheet metals. The invention will be described in that context for simplicity, although the broad utility will be obvious.

The sheet metal cooling and lubricating liquids generally comprise an emulsion of oil as the disperse phase in water as the continuous phase together with suitable emulsifiers. Such a fluid is frequently referred to as a "soluble oil" and may typically consist of about 5% of a lubricating oil dispersed in water carrying an emulsifier such as a rosin soap, petroleum sulfonate, polyethylene oxide derivatives, and the like. When such a soluble oil is used in the rolling of aluminum, for example, it may become contaminated in several ways. A major source of contamination is the oil leakage from hydraulic controls and bearings in the rolling mill. Another source of contamination is oil that separates from the emulsion by reason of its degradation. These contaminating oils become suspended in the soluble oil emulsion without becoming actually emulsified. Contaminating oils are commonly referred to as "tramp oil." Metal and metal oxide particles are usually found dissolved or suspended in the tramp oil.

The non-emulsified tramp oil represents a relatively large particle, whereas the emulsified soluble oil represents a relatively small particle. Because of these differences in size and differences in electrical properties, a gravitational separation can be utilized for purification of the soluble oil following which the soluble oil can be recirculated and used for the rolling of more metal. The gravitational separation may be used alone for purification or in combination with other techniques such as filtration.

In accordance with the present invention, it has been discovered that the desired type of gravitational separation can be accomplished with a fluid system such as the soluble oil-tramp oil system by flowing the fluid system into and through a separation tank designed to provide any selected corrected separation index if the tank dimensions and flow rate are adjusted to create turbulence and non-laminar flow through the settling tank. The flow and tank dimension parameters are selected so that the turbulence is of a magnitude sufficient to maintain the homogeneous condition of the soluble oil emulsion, but insufficient to prevent gravitational separation of the tramp oil from the soluble oil.

As a further critical refinement, the present invention contemplates a separation tank provided with means for avoiding short circuiting of the fluid on its path through the separation chamber. To avoid short circuiting, each portion of fluid is caused to enter the separation tank along the longitudinal path of flow and pass through the separation tank while retaining its same relative distance from the longitudinal axis of flow. In other words, if fluid enters near the side of the tank, the present invention seeks to cause the fluid to continue all the way through near the side of the tank. If fluid enters near the center of the flow path, the invention seeks to keep the fluid near the center of the flow path. Short circuiting would occur, for example, if the fluid moves from the side towards the center on its passage through the tank. In the preferred embodiment, directing of the fluid so that it traverses the desired path without short circuiting is accomplished by a plurality of baffles disposed near the inlet to the tank.

Also in the preferred embodiment it is found that where the parameters of flow rates and tank geometry are selected so that the fluid exhibits a Reynolds number of about 30,000-100,000, the desired degree of turbulence is created so that the gravitional separation desired can be accomplished without causing a breakout and separation of the component parts of the soluble oil.

The accompanying drawing illustrates a tank suitable for practicing the type of separation referred to above. It also illustrates the use of a separation tank in combination with a filter and tramp oil skimming roller which may optionally be used as part of the total process.

With respect to the drawing, FIG. 1 illustrates a separation tank having a generally rectangular chamber 10 with an inlet end 11 and an outlet end 12. Inlet end 11 includes a drain basin 13 which may advantageously be used for receiving a fluid supply from a filter. For example, as shown in FIG. 2, a filter 14 of any type conventionally used in this art may be disposed above drain basin 13 so that fluid being discharged from filter 14 will enter separation tank 10 through basin 13. As further illustrated in FIG. 2, a source of fluid 15 containing fluid to be filtered and separated (which may come from a sheet metal rolling mill, for example) is suitably carried to filter 14 by conduit 16 with the assistance of pump 17.

The fluid flowing downwardly and into basin 13 from filter 14 is then guided so that short circuiting does not occur while the fluid passes through the main portion of tank 10. To this end, a plurality of vertical parallel plates 18 are disposed in the entrance of inlet 11 of tank 10 to guide fluid through the separation zone between inlet end 11 and outlet end 12 so that the direction of flow over any transverse plane through the separation zone (indicated generally at 19) is substantially parallel to the longitudinal axis through separation zone 19.

At the same time, the dimensions of tank 10 and the rate of fluid flow therethrough is adjusted so that turbulence and non-laminar flow is obtained. Further, the amount of turbulence is such that the tramp oil will be caused to float on the top of the soluble oil in separation zone 19 while the oil-water emulsion of the soluble oil remains intact and homogeneous as the bottom layer. As noted above, where the parameters are selected so that a Reynolds number of about 30,000–100,000 is created excellent results have been observed.

In forming the inlet end of tank 10 with plates 18 to form a baffle structure, the ends of plate 18 may be attached to a supporting rod 20 fixed transversely across the walls of tank 10. This will serve to keep plates 18 in a fixed position to resist pressures created by the turbulent flowing fluid.

In the embodiment illustrated it is noted that the transverse dimension of drain basin 13 at inlet end 11 is less than the width of tank 10. Therefore, plates 18 commence in basin 13 in parallel evenly-spaced locations and thence are bent outwardly from straight central plate 18' so that they retain their uniformly spaced apart parallel relationship at the point where they meet with rod 20. Consequently, the fluid from basin 13 is spread from a smaller cross sectional area to a larger cross sectional area while retaining the fluid in its same relative positions from the center line of flow of the fluid and this is done to avoid short circuiting. If short circuiting occurs, some portions of the fluid may not be subjected to the degree of turbulence as desired and a breaking of the soluble oil emulsion might occur in selected areas at any given time or, alternatively, the gravitational separation of the tramp oil from the soluble oil might not occur where the short circuited fluid was subjected to excessive turbulence.

At the discharge end 12 of tank 10 a pair of transverse parallel plates 21 and 22 are disposed. The baffle created by plates 21 and 22 permits the soluble oil lower phase in separation zone 19 to pass under plate 22 and over plate 21 through a discharge conduit 23 and into a reservoir 24. Reservoir 24 contains purified separated soluble oil suitable for ricirculation through a rolling mill, for example.

The function of the baffle created by plates 21 and 22 is to assure a uniform discharge flow that will not disturb the uniformity and controlled turbulence desired in separation zone 19. In general, a discontinuity of the level in the discharge end 12 of tank 10 and conduit 23 will occur and it should be clear that the effect of this discontinuity must not be transmitted back to affect the separation zone.

While fluid is undergoing gravitational separation in zone 19, the fluid may achieve a level as indicated at 25. The fluid near the level at 25 constitutes the lighter component and in the case of the soluble oil-tramp oil system represents tramp oil. If desired, and as will usually be necessary in a continuous system, the tramp oil should be separated as by decanting or skimming. In FIG. 2, one technique for removing the tramp oil contemplates the use of a skimming roller assembly 26, including a transverse roller 27 whose surface contacts fluid at its level 25. The surface of roller 27 is suitably selected to be formed from a material that will cause the surface tramp oil to adhere so that upon rotation of roller 27, the tramp oil will move upwardly with it. During the course of rotation of roller 27, the adhered tramp oil can be scraped from its surface and discharged outwardly from tank 10. Details of a suitable type of skimmer may be found in co-pending appliaction, Ser. No. 436,788, filed Mar. 3, 1965.

The tank illustrated in FIG. 1 with the baffle plates 18 is particularly important where flow to the input end of the settling tank arrives in a conduit of a given cross section and the settling tank is of a larger cross sectional area. In this case, control of the flow to prevent short circuiting is most critical. If not prevented, too great a flow will normally occur in the center of tank 10 and too little flow will normally occur at its sides. In such a state, tramp oil droplets which are tending to coalesce and form a layer for skimming at the top will be broken and redispersed in the center of the tank, while at the same time the soluble oil emulsion near the sides of the tank will begin to settle and separate.

As an illustration of the present invention, a tramp oil-soluble oil system utilized in an aluminum rolling mill can be successfully operated wherein the separation tank of the type described has the following dimensions under the flow conditions indicated:

| | |
|---|---|
| Q (c.f.m.) (1000 gallons/minute) | 135 |
| D (ft.) | 4 |
| L (ft.) | 20.5 |
| W (ft.) | 18 |
| $m$ (ft.) | 2.77 |
| $v$ ft./min. | 1.87 |
| $T_D$ min. | 10.9 |
| O.R. ft./min. | 0.336 |
| $Re$ | 62,600 |
| $(S.I.)_c$ sec. | 25.8 |
| G.p.m./w. | 55.5 | where:

Q=flow—ft.$^3$/min.
D=tank depth—ft.
$(S.I.)_c$=corrected separation index—seconds
L=tank length—ft.
$m$=hydraulic radius—ft.
V=superficial velocity—ft./min.
O.R.=overflow rate—ft./min.
$T_D$=minutes, detention
$Re$=Reynolds number The recycle conduit 28 shown in FIG. 2 can be optionally included for further refinement in control over the system. For example, in the illustration of the system just given the corrected separation index is 25.8 seconds. At some time the 25.8 second separation index may represent a system of excessive separating efficiency. If such is the case the emulsion becomes too "tight" and the fluid being recirculated to the rolling mill is composed of too great a proportion of small particles. It may then be desirable to make the emulsion "looser" by separating less of the larger particles and thereby improve its lubricity for the environment involved. To accomplish this the efficiency of the separation tank is reduced. Since the tank dimensions are fixed after installation for all practical purposes, the only variable in the formula for the separation index is Q. Because it is not feasible to change the flow from the rolling mill, Q is increased through tank 10 by taking a portion of the fluid from outlet end 12 and re-introducing it into basin 13 for another pass through separation zone 19. The amount of fluid recycled will depend on how much reduction in efficiency is required. The desired separation index is applied to the formula and a necessary value for Q calculated. The difference between the input to basin 13 obtained from the rolling mill and the new calculated value represents the amount of fluid that must be recycled. To this end pump 29 is actuated and valve 30 opened a sufficient amount to permit the passage of the necessary volume of fluid.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method for the separation of first and second immiscible fluids in which the second fluid is a separable homogeneous combination of a plurality of fluids comprising: introducing and flowing a mixture of said first and second immiscible fluids through a separation zone having a larger cross-sectional area than the cross-sectional area of said mixture at the point of its introduction into said separation zone, restricting the direction of flow of said mixture during its introduction into said separation zone to maintain the same general relative transverse distribution of components in said mixture in said separation zone as in the fluid mixture just prior to introduction into the separation zone, maintaining said general relative transverse distribution of components in said mixture while flowing said mixture through said separation zone, regulating the flow rate through said separation zone to a rate fast enough to create turbulence and non-laminar flow through said separation zone of a magnitude sufficient to maintain the homogeneous condition of said second fluid but insufficient to prevent gravitational separation of the first and second fluids, retaining said first and second fluids in the separation zone for a time necessary for gravity to separate said first and second fluids, removing separated portions of said first and second fluids, and recycling at least a portion of at least one of said first and second fluids through said separation zone at a predetermined rate for creating a preselected amount of turbulence in said separation zone.

2. Apparatus for the separation of fluids comprising: a rectangular gravitational settling chamber having an inlet at one end of smaller cross-sectional area than said chamber, a plurality of vertical plates having first sections generally parallel with the long sides of said chamber disposed at said inlet, second sections of said plates extending angularly outwardly from said first sections towards the chamber sides, third sections extending from said second sections to lie generally parallel with the long sides of said chamber, and means for removing separated fluids from said chamber.

3. Apparatus in accordance with claim 2 and including fluid retaining walls at said inlet to form a drain basin over said first sections of said plates, and filter means in fluid communication with said drain basin.

4. A method for the separation of first and second immiscible fluids in which the second fluid is a separable homogeneous combination of a plurality of fluids comprising: introducing and flowing a mixture of said first and second immiscible fluids through a separation zone having a larger cross-sectional area than the cross-sectional area of said mixture at the point of its introduction into said separation zone, restricting the direction of flow of said mixture during its introduction into said separation zone to maintain the same general relative transverse distribution of components in said mixture in said separation zone as in the fluid mixture just prior to introduction into the separation zone, maintaining said general relative transverse distribution of components in said mixture while flowing said mixture through said separation zone, regulating the flow rate through said separation zone to a rate fast enough to create turbulence and non-laminar flow through said separation zone of a magnitude sufficient to maintain the homogeneous condition of said second fluid but insufficient to prevent gravitational separation of the first and second fluids, said flow rate being selected so that the first and second fluid mixture is placed in a turbulent motion corresponding to a Reynolds number of about 30,000–100,000 in said separation zone, retaining said first and second fluids in the separation zone for a time necessary for gravity to separate said first and second fluids, and removing separated portions of said first and second fluids from the separation zone.

5. The method in accordance with claim 4 wherein said first and second fluids are composed of different particle sizes, the first fluid being an oil substantially insoluble in said second fluid, and said second fluid being an oil-water emulsion.

References Cited

UNITED STATES PATENTS

| 655,045 | 7/1900 | Bender. |
| 1,116,903 | 11/1914 | McClintock _____ 210—262 X |
| 1,672,583 | 6/1928 | Travers _____ 210—84 |
| 1,860,819 | 5/1932 | Schamberger. |
| 2,730,190 | 1/1956 | Brown et al. _____ 210—197 X |
| 3,015,621 | 1/1962 | Quast _____ 210—519 X |
| 3,067,877 | 12/1962 | Mobler _____ 210—83 |
| 3,147,221 | 9/1964 | Johnston _____ 210—519 |
| 3,195,727 | 7/1965 | Kibbee _____ 210—521 X |

SAMIH N. ZAHARNA, *Primary Examiner.*

JOHN ADEE, *Assistant Examiner.*

U.S. Cl. X.R.

210—261, 519